US009279363B2

(12) United States Patent  
De Gooijer

(10) Patent No.: US 9,279,363 B2  
(45) Date of Patent: Mar. 8, 2016

(54) RECIPROCATING PISTON MECHANISM

(75) Inventor: Lambertus Hendrik De Gooijer, Naarden (NL)

(73) Assignee: Gomecsys B.V., Naarden (NL)

( * ) Notice: Subject to any disclaimer, the term of this patent is extended or adjusted under 35 U.S.C. 154(b) by 1004 days.

(21) Appl. No.: 13/384,055

(22) PCT Filed: Jul. 15, 2009

(86) PCT No.: PCT/EP2009/059040
§ 371 (c)(1),
(2), (4) Date: Apr. 2, 2012

(87) PCT Pub. No.: WO2011/006537
PCT Pub. Date: Jan. 20, 2011

(65) Prior Publication Data
US 2012/0180583 A1    Jul. 19, 2012

(51) Int. Cl.
*F16H 21/22*    (2006.01)
*F02B 67/04*    (2006.01)

(52) U.S. Cl.
CPC ........... *F02B 67/04* (2013.01); *Y10T 74/18208* (2015.01)

(58) Field of Classification Search
CPC .......................... F02B 67/04; Y10T 74/18208
See application file for complete search history.

(56) References Cited

U.S. PATENT DOCUMENTS

| 2,271,766 | A | 2/1942 | Huebotter |
| 3,686,972 | A | 8/1972 | McWhorter |
| 3,861,239 | A | 1/1975 | McWhorter |
| 4,152,955 | A | 5/1979 | McWhorter |
| 4,237,741 | A | 12/1980 | Huf et al. |
| 4,860,702 | A | 8/1989 | Doundoulakis |
| 5,170,757 | A | 12/1992 | Gamache |
| 5,482,015 | A | 1/1996 | Fish |

(Continued)

FOREIGN PATENT DOCUMENTS

| AU | 7857681 A | 6/1982 |
| DE | 181913 | 3/1907 |

(Continued)

OTHER PUBLICATIONS

Notice of Reasons for Rejection for corresponding Japanese application 2012-519893, mailing date Jul. 30, 2013.

(Continued)

*Primary Examiner* — Terence Boes
(74) *Attorney, Agent, or Firm* — Steven M. Koehler; Westman, Champlin & Koehler P.A.

(57) ABSTRACT

A reciprocating piston mechanism comprises a crankcase and a crankshaft (rotatable about a crankshaft axis) which has at least a crankpin having a crankpin. A connecting rod includes a big end rotatably mounted on the crankpin and a small end rotatably connected to a piston. The crank member is provided with a crank member gear that meshes with an intermediate gear, both gears of which are external gears along with first and second auxiliary gears. The intermediate gear meshes with the first auxiliary gear. The first auxiliary gear is fixed to the second auxiliary gear via a common auxiliary shaft that mounts to the crankshaft and rotates with respect thereto about an auxiliary shaft axis that extends parallel to the crankshaft axis. The second auxiliary gear meshes with a central gear. The central gear is an internal gear, which has a center line that coincides with the crankshaft axis.

13 Claims, 4 Drawing Sheets

(56) References Cited

U.S. PATENT DOCUMENTS

| | | |
|---|---|---|
| 5,605,120 A | 2/1997 | Hedelin |
| 5,611,301 A | 3/1997 | Bergsten et al. |
| 5,927,236 A | 7/1999 | Gonzalez |
| 6,349,684 B1 | 2/2002 | De Gooijer |
| 7,293,542 B2 | 11/2007 | Ozdamar |
| 2003/0183026 A1 | 10/2003 | Korniyenko et al. |
| 2006/0053964 A1 | 3/2006 | Venettozzi |
| 2009/0133653 A1* | 5/2009 | Duzzie et al. ............ 123/90.31 |
| 2009/0188337 A1 | 7/2009 | Chio |
| 2011/0036334 A1 | 2/2011 | De Gooijer |
| 2014/0360292 A1* | 12/2014 | De Gooijer ................... 74/44 |

FOREIGN PATENT DOCUMENTS

| | | |
|---|---|---|
| DE | 488059 C | 12/1929 |
| DE | 2947882 | 7/1981 |
| DE | 3642681 | 12/1986 |
| DE | 3634536 | 2/1987 |
| EP | 0184042 | 6/1986 |
| EP | 0345366 | 12/1989 |
| FR | 986605 A | 8/1951 |
| FR | 2680402 | 2/1993 |
| GB | 173252 | 12/1921 |
| GB | 1094649 | 12/1967 |
| JP | 6113276 | 6/1986 |
| JP | 61187931 | 11/1986 |
| JP | 361135 | 3/1991 |
| JP | 10121981 | 10/1996 |
| JP | 2002286020 | 10/2002 |
| JP | 2007113471 A | 5/2007 |
| JP | 200936030 | 2/2009 |
| WO | WO 86/07115 | 12/1986 |
| WO | 9745647 | 12/1997 |
| WO | WO 02/059503 | 8/2002 |
| WO | 03/098005 | 11/2003 |
| WO | WO 2006/004612 | 1/2006 |
| WO | WO 2008/129025 | 10/2008 |
| WO | WO 2009/100759 | 8/2009 |
| WO | WO 2011006537 | 1/2011 |

OTHER PUBLICATIONS

International Search Report of the European Patent Office Patent Office in counterpart foreign application No. PCT/EP2009/059040 filed Jul. 15, 2009.

Written opinion of the European Patent Office in foreign application No. PCT/EP2009/051702 filed Feb. 13, 2009.

Official Search Report of the European Patent Office in foreign application No. PCT/EP2009/051702 filed Feb. 13, 2009.

Notice of Reasons for Rejection for Japanese Application No. 2010-546348, mailed Nov. 6, 2012.

Decision of Rejection for Japanese Application No. 2010-546348, mailed Jun. 11, 2013.

Office action mailed Oct. 9, 2012 for U.S. Appl. No. 12/866,942, filed Aug. 10, 2010, 20 pages.

Notice of Reasons for Rejection for Japanese Application No. 2010-546348, mailing date Nov. 6, 2012.

\* cited by examiner

RECIPROCATING PISTON MECHANISM

CROSS-REFERENCE TO RELATED APPLICATION

This application is a Section 371 National Stage Application of International Application PCT/EP2009/059040 filed Jul. 15, 2009 and published as WO 2011/006537 A1 in English.

BACKGROUND

The discussion below is merely provided for general background information and is not intended to be used as an aid in determining the scope of the claimed subject matter.

The present invention relates to a reciprocating piston mechanism.

A reciprocating piston mechanism is described in an earlier application PCT/EP2008/051727 of the applicant.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A reciprocating piston mechanism comprises a crankcase; a crankshaft which has at least a crankpin, wherein the crankshaft is supported by the crankcase and rotatable with respect thereto about a crankshaft axis; at least a connecting rod including a big end and a small end; a piston which is rotatably connected to the small end; a crank member which is rotatably mounted on the crankpin, and which comprises at least a bearing portion and has an outer circumferential wall which bears the big end of the connecting rod such that the connecting rod is rotatably mounted on the bearing portion of the crank member via the big end; wherein the crank member is provided with a crank member gear that is an external gear, which meshes with an intermediate gear that is an external gear, which intermediate gear also meshes with a first auxiliary gear that is an external gear, wherein the first auxiliary gear is fixed to a second auxiliary gear that is an external gear, via a common auxiliary shaft, which auxiliary shaft is mounted to the crankshaft and rotatable with respect thereto about an auxiliary shaft axis extending parallel to the crankshaft axis, which second auxiliary gear meshes with a central gear that is an internal gear, which has a center line that coincides with the crankshaft axis.

The advantage of this mechanism is that the intermediate gear may run at a relatively low speed. In practice the intermediate gear may run at about the crankshaft speed. Besides, due to the relatively large contact surface between the teeth of the second auxiliary gear and the central gear the mechanism is beneficial in terms of noise and vibrations. Furthermore, the applicant has discovered that an engine comprising the reciprocating piston mechanism has lower friction losses than a conventional engine without the crank member and gear transmissions.

In a practical embodiment the bearing portion is eccentrically disposed with respect to the crankpin. This provides the opportunity to influence the bottom and top dead center of the piston.

In a preferred embodiment the crank member gear meshes with at least a further intermediate gear which also meshes with the first auxiliary gear, since this distributes forces within the mechanism.

The crankshaft may be provided with a crankshaft bearing and the auxiliary shaft may extend within the outer circumference of the crankshaft bearing. The advantage of this embodiment is that a relatively compact mechanism can be built.

The crankshaft may comprise at least a second crankpin which is angularly spaced with respect to the crankpin about the crankshaft axis, and at least a second crank member rotatably mounted on the second crankpin, wherein the second crank member is provided with a second crank member gear being an external gear, wherein the second crank member gear meshes with a second intermediate gear, being an external gear, which second intermediate gear also meshes with a third auxiliary gear being an external gear which is fixed to the common auxiliary shaft. This provides the opportunity to built larger mechanisms including multiple pistons.

The central gear may be rotatable about the crankshaft axis and the mechanism may be provided with a drive means for driving the central gear. This allows to influence the top dead center and bottom dead center of the piston by rotating the central gear at a certain angle.

BRIEF DESCRIPTION OF THE DRAWINGS

Aspects of the invention will hereafter be elucidated with reference to the schematic drawings showing embodiments of the invention by way of example.

DETAILED DESCRIPTION

Figure 1:
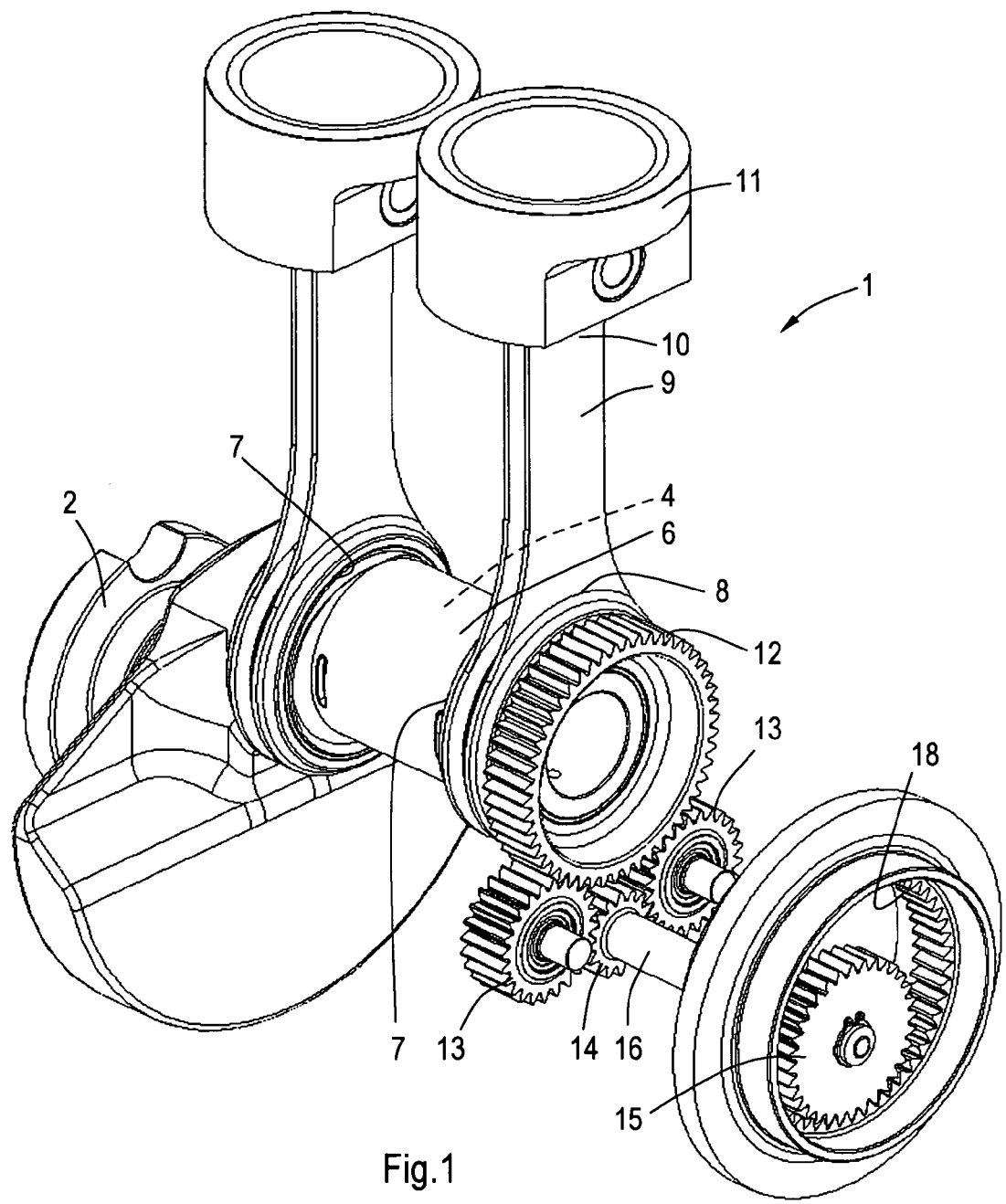
FIG. 1 is a perspective view of an embodiment of a reciprocating piston mechanism.
Figure 2:
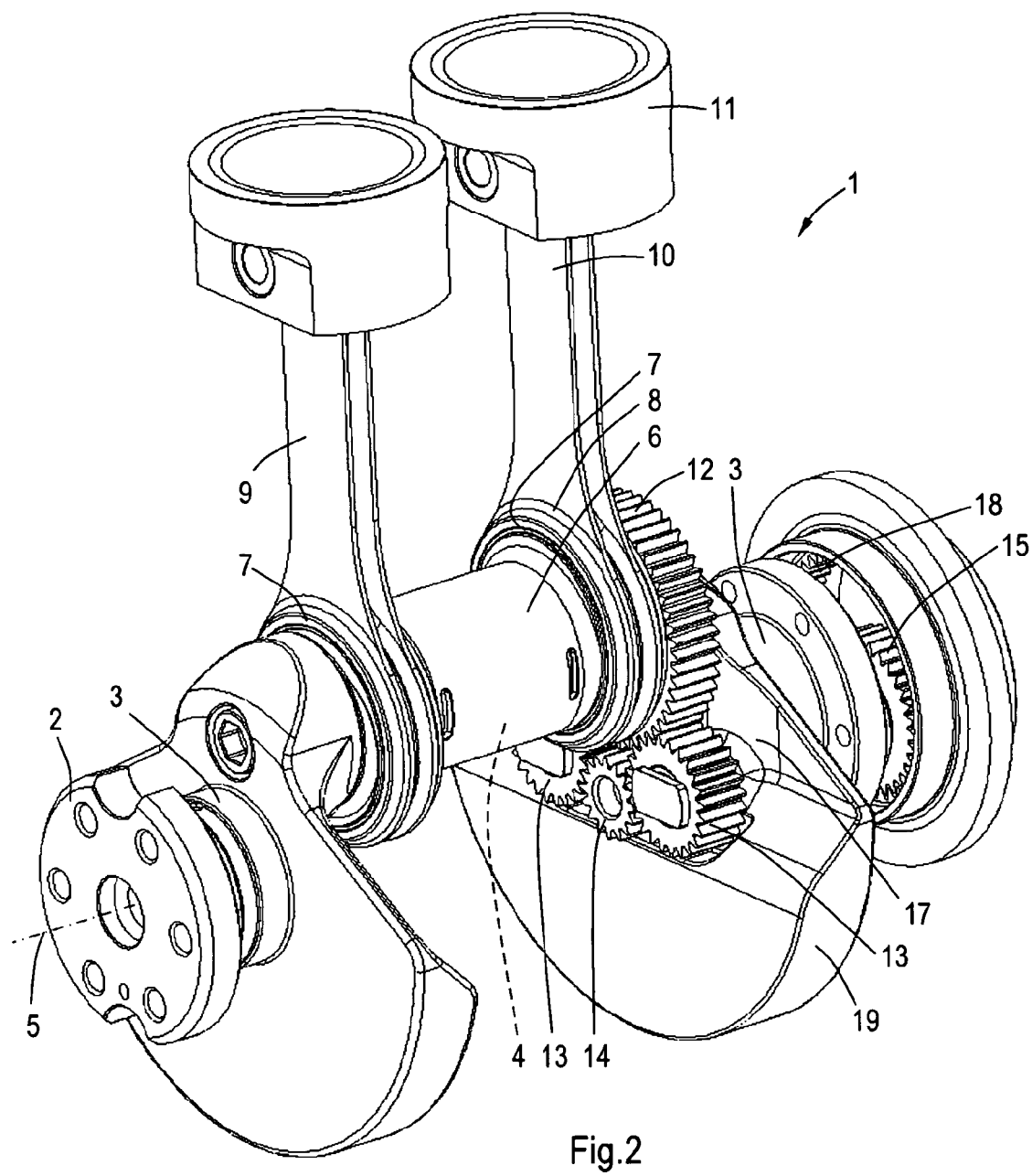
FIG. 2 is a similar view as FIG. 1, but showing the embodiment from a different point of view and including a crankshaft bearing at the side of the central gear.

FIGS. 1 and 2 show an embodiment of a reciprocating piston mechanism 1, which is suitable for an internal combustion engine. The reciprocating piston mechanism 1 comprises a crankcase (not shown), which supports a crankshaft 2 by crankshaft bearings 3. The crankshaft 2 in the embodiment includes a crankpin 4 and is rotatable with respect to the crankcase about a crankshaft axis 5.

The reciprocating piston mechanism 1 comprises a crank member 6 which is rotatably mounted on the crankpin 4. The crank member 6 is provided with two bearing portions 7 which are disposed eccentrically with respect to the crankpin 4. Each of the bearing portions 7 has an outer circumferential wall which bears a big end 8 of a connecting rod 9. Thus, the connecting rod 9 is rotatably mounted on the crank member 6 via its big end 8. The connecting rod 9 also includes a small end 10 to which a piston 11 is rotatably connected.

The crank member 6 is provided with a crank member gear 12 which meshes with two intermediate gears 13. The intermediate gears 13 are rotatably mounted to the crankshaft 2. Each of the intermediate gears 13 meshes also with a first auxiliary gear 14. The first auxiliary gear 14 is fixed to a second auxiliary gear 15 via a common auxiliary shaft 16. The auxiliary shaft 16 is mounted to the crankshaft 2 and is rotatable with respect to the crankshaft 2 about an auxiliary shaft axis which extends parallel to the crankshaft axis 5. This means that the auxiliary shaft axis is spaced from the crankshaft axis 5. In this embodiment the auxiliary shaft 16 extends through a crank arm 17 such that the first auxiliary gear 14 and the second auxiliary gear 15 are disposed at opposite sides of the crank arm 17 and the crankshaft bearing 3. In this case the crank arm 17 and a crankshaft bearing 3 are integrated such that the auxiliary shaft 16 extends through both. Thus, the auxiliary shaft 16 extends within an outer circumference of the crankshaft bearing 3.

The second auxiliary gear 15 meshes with a central gear 18 having a center line which coincides with the crankshaft axis 5. In this embodiment the central gear 18 is an internal gear and the second auxiliary gear 15 is an external gear.

The crank member gear 12 is an external gear and the intermediate gears 13 are external gears. Due to this configuration the reciprocating piston mechanism 1 can be built in a compact way and is simpler than those known in the art.

It can be seen in FIGS. 1 and 2 that the intermediate gears 13 are disposed at a side of the crankshaft 2 where a counterweight 19 is located which creates a compact structure.

The gear dimensions can be selected such that the crank member 6 rotates in the same direction as the crankshaft 2 and at half speed thereof. The gear ratio between the central gear 18 and the second auxiliary gear 15 may be half as high as the gear ratio between the crank member gear 12 and the first auxiliary gear 14. This condition may be achieved by a certain choice of diameters and gear teeth modulus.

Figure 3:
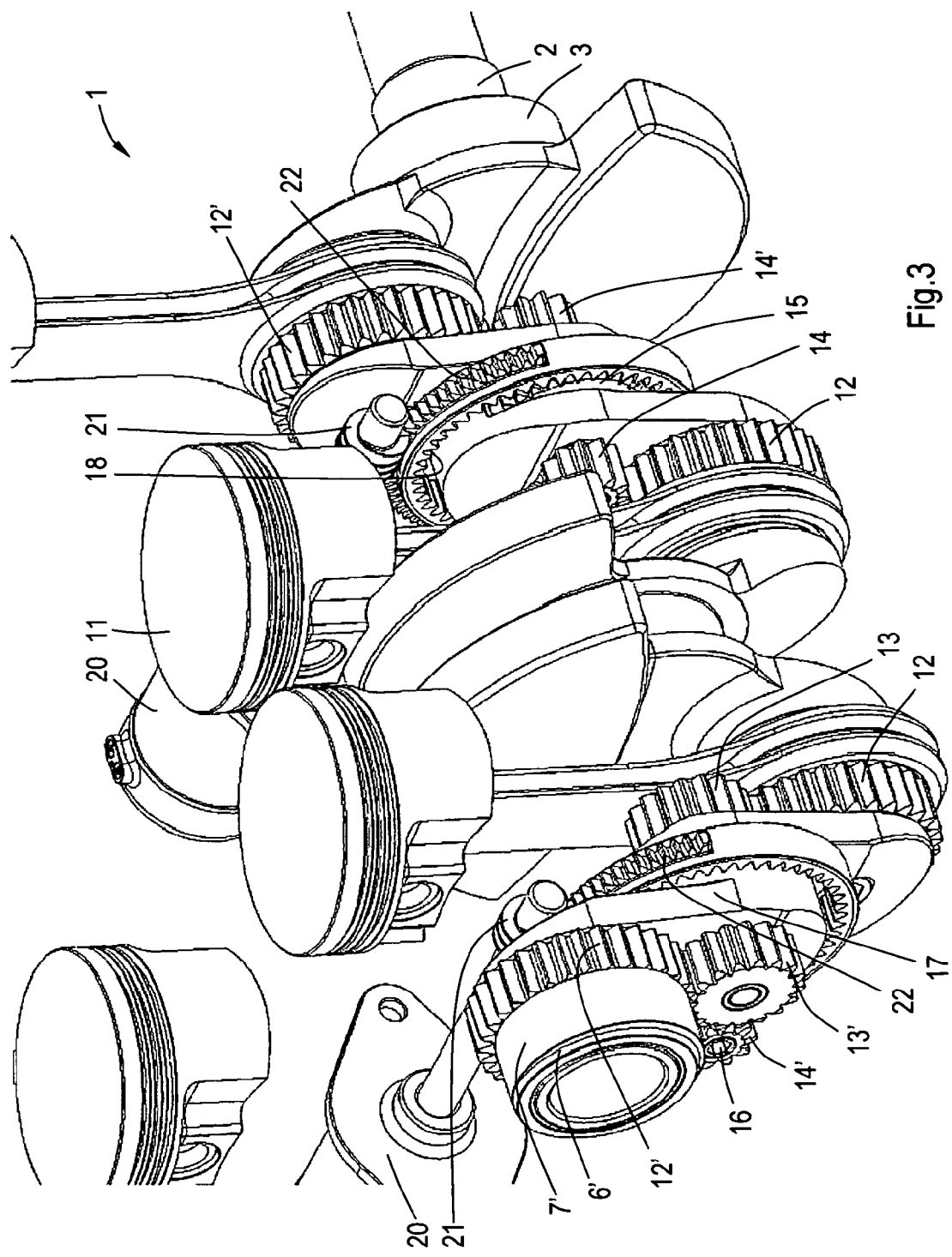
FIG. 3 is a perspective partly cut-away view of an alternative embodiment of a reciprocating piston mechanism.
Figure 4:
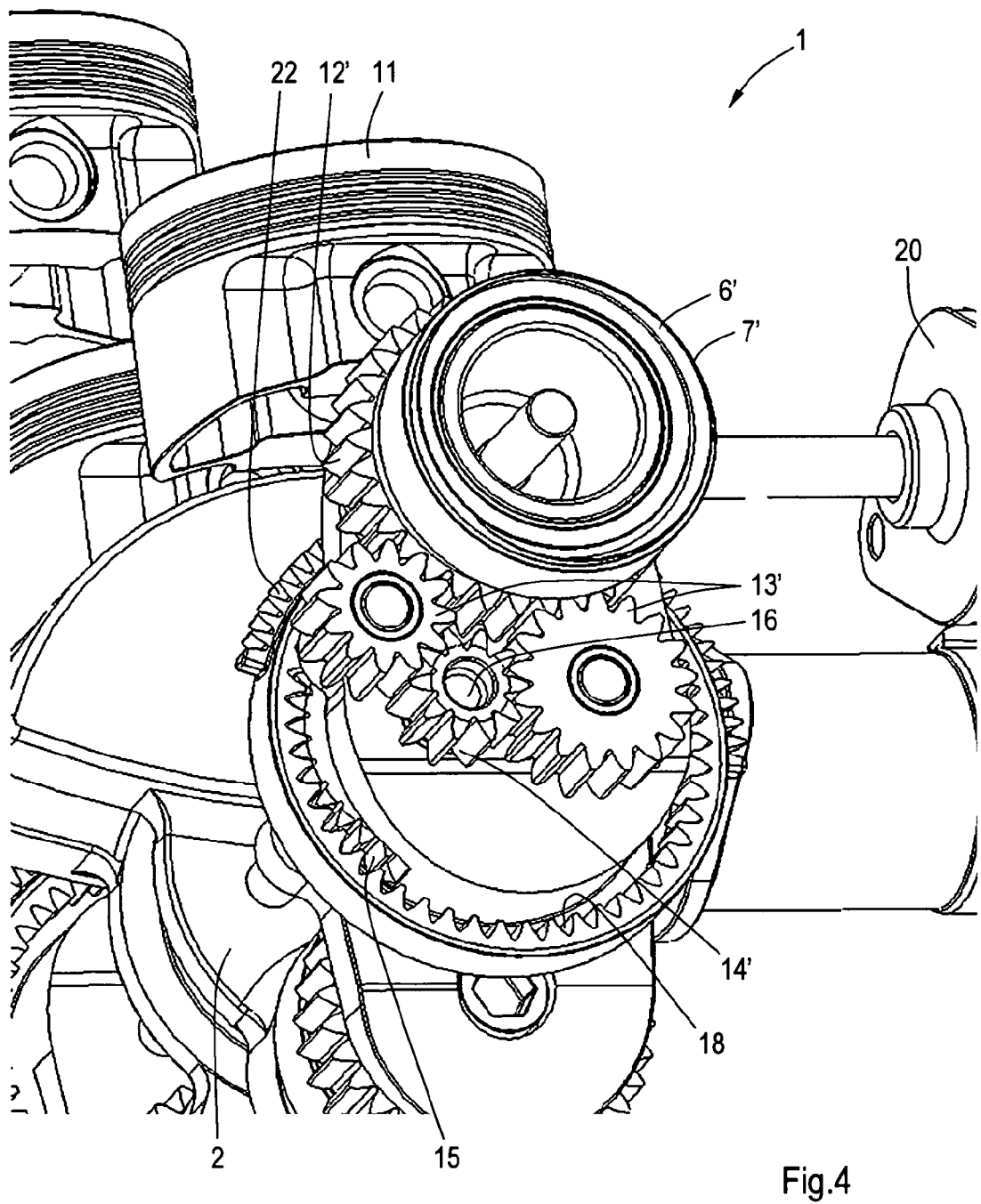
FIG. 4 is a similar view as FIG. 3, but showing another alternative embodiment from a different point of view at a larger scale, wherein the mechanism includes two intermediate gears.

FIGS. 3 and 4 show alternative embodiments of a reciprocating piston mechanism 1. In these embodiments the mechanism 1 comprises four pistons 11. Each of the pistons 11 is connected to a single crank member 6. Thus, each crank member 6 supports only one connecting rod 9. The locations and the mutual meshing of the crank member gear 12, the intermediate gear 13, the first auxiliary gear 14, the second auxiliary gear 15 and the central gear 18 are similar to the embodiment according to FIGS. 1 and 2. In the embodiments according to FIGS. 3 and 4 there are two auxiliary shafts 16. Each auxiliary shaft 16 extends through a crank arm 17. In these embodiments a third auxiliary gear 14' is fixed to the auxiliary shaft 16, such that the second auxiliary gear 15 lies between the first auxiliary gear 14 and the third auxiliary gear 14'. The third auxiliary gear 14' meshes with a second intermediate gear 13' in case of the embodiment according to FIG. 3 and with two second intermediate gears 13' in case of the embodiment according to FIG. 4. The intermediate gear 13' are rotatably mounted to the crankshaft 2. The second intermediate gear or gears 13' meshes or mesh with a second crank member gear 12' which is provided to a second crank member 6'. The second crank member 6' is rotatably mounted to a second crank pin which is angularly spaced with respect to the crankpin 4 about the crankshaft axis 5. FIG. 3 shows that the second crank member 6' comprises a second bearing portion 7' for bearing the connecting rod 9.

FIGS. 3 and 4 also show a drive means of the central gear 18. The drive means comprises an actuator 20, which is able to drive the central gear 18 via a worm 21 and worm gear 22, but alternative drive means are conceivable. The worm gear 22 is formed by an external gear on the central gear 18. Upon rotation of the central gear 18 the top and bottom dead center of the pistons 11 can be influenced.

It is noted that the diameters of the intermediate gears 13 which each mesh with the first auxiliary gear 14 as well as with the crank member gear 12 are not necessarily identical.

The same is true for the second intermediate gears 13' as shown in the embodiment according to FIG. 4. This provides design flexibility.

It is also noted that combinations of different features of the embodiments as described hereinbefore may be combined.

From the foregoing, it will be clear that an aspect of the invention provides a relatively simple reciprocating piston mechanism which provides the possibility of designing a compact embodiment of the mechanism.

The invention is not limited to the embodiments shown in the drawings and described hereinbefore, which may be varied in different manners within the scope of the claims and their technical equivalents. For example, the reciprocating piston mechanism may be extended to larger mechanisms having more pistons than the embodiments as described hereinbefore. Furthermore, the intermediate gears at both sides of the crank arm may have different dimensions whereas the crank member may still rotate in the same direction as the crankshaft and at half speed thereof. In an alternative embodiment the crank member may be cylindrical instead of eccentrical, which appears to result in lower friction losses than in a conventional mechanism having no crank member and gear transmission for driving the crank member.

The invention claimed is:

1. A reciprocating piston mechanism comprising a crankcase;
   a crankshaft having at least a crankpin, said crankshaft being supported by the crankcase and rotatable with respect thereto about a crankshaft axis;
   at least a connecting rod including a big end and a small end;
   a piston being rotatably connected to the small end;
   a crank member being rotatably mounted on the crankpin, and comprising at least a bearing portion having an outer circumferential wall which bears the big end of the connecting rod such that the connecting rod is rotatably mounted on the bearing portion of the crank member via the big end;
   wherein the crank member is provided with a crank member gear, being an external gear, which meshes with at least an intermediate gear, being an external gear, which intermediate gear also meshes with a first auxiliary gear being an external gear, wherein the first auxiliary gear is fixed to a second auxiliary gear, being an external gear, via a common auxiliary shaft, which auxiliary shaft is mounted to the crankshaft and rotatable with respect thereto about an auxiliary shaft axis extending parallel to the crankshaft axis, which second auxiliary gear meshes with a central gear, being an internal gear, having a center line which coincides with the crankshaft axis: and
   wherein the crankshaft is provided with a crankshaft bearing through which the crankshaft is supported by the crankcase, and the auxiliary shaft extends within an outer circumference of the crankshaft bearing.

2. The reciprocating piston mechanism according to claim 1, wherein the bearing portion is eccentrically disposed with respect to the crankpin.

3. The reciprocating piston mechanism according to claim 2, wherein the crank member gear meshes with at least a further intermediate gear which also meshes with the first auxiliary gear.

4. The reciprocating piston mechanism according to claim 2, wherein the crankshaft comprises at least a second crankpin which is angularly spaced with respect to the crankpin about the crankshaft axis, and at least a second crank member rotatably mounted on the second crankpin, wherein the second crank member is provided with a second crank member gear being an external gear, wherein the second crank member gear meshes with at least a second intermediate gear, being an external gear, which second intermediate gear also meshes with a third auxiliary gear being an external gear which is fixed to the common auxiliary shaft.

5. The reciprocating piston mechanism according to claim 2, wherein the central gear is rotatable about the crankshaft axis and the mechanism is provided with a drive means for driving the central gear.

6. The reciprocating piston mechanism according to claim 1, wherein the crank member gear meshes with at least a further intermediate gear which also meshes with the first auxiliary gear.

7. The reciprocating piston mechanism according to claim 6, wherein the crankshaft comprises at least a second crankpin which is angularly spaced with respect to the crankpin about the crankshaft axis, and at least a second crank member rotatably mounted on the second crankpin, wherein the second crank member is provided with a second crank member gear being an external gear, wherein the second crank member gear meshes with at least a second intermediate gear, being an external gear, which second intermediate gear also meshes with a third auxiliary gear being an external gear which is fixed to the common auxiliary shaft.

8. The reciprocating piston mechanism according to claim 6, wherein the central gear is rotatable about the crankshaft axis and the mechanism is provided with a drive means for driving the central gear.

9. The reciprocating piston mechanism according to claim 1, wherein the crankshaft comprises at least a second crankpin which is angularly spaced with respect to the crankpin about the crankshaft axis, and at least a second crank member rotatably mounted on the second crankpin, wherein the second crank member provided with a second crank member gear being an external gear, wherein the second crank member gear meshes with at least a second intermediate gear, being an external gear, which second intermediate gear also meshes with a third auxiliary gear being an external gear which is fixed to the common auxiliary shaft.

10. The reciprocating piston mechanism according to claim 9, wherein the central gear is rotatable about the crankshaft axis and the mechanism is provided with a drive means for driving the central gear.

11. The reciprocating piston mechanism according to claim 1, wherein the central gear rotatable about the crankshaft axis and the mechanism is provided with a drive means for driving the central gear.

12. The reciprocating piston mechanism according to claim 1, wherein the crankshaft comprises at least a second crankpin which is angularly spaced with respect to the crankpin about the crankshaft axis, and at least a second crank member rotatably mounted on the second crankpin, wherein the second crank member is provided with a second crank member gear being an external gear, wherein the second crank member gear meshes with at least a second intermediate gear, being an external gear, which second intermediate gear also meshes with a third auxiliary gear being an external gear which is fixed to the common auxiliary shaft.

13. The reciprocating piston mechanism according to claim 1, wherein the central gear is rotatable about the crankshaft axis and the mechanism is provided with a drive means for driving the central gear.

* * * * *